United States Patent
Ito et al.

(10) Patent No.: US 7,414,524 B2
(45) Date of Patent: Aug. 19, 2008

(54) LIGHTING CONTROL CIRCUIT FOR VEHICLE LIGHTING EQUIPMENT

(75) Inventors: Masayasu Ito, Shizuoka (JP); Hitoshi Takeda, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 227 days.

(21) Appl. No.: 11/217,200

(22) Filed: Sep. 1, 2005

(65) Prior Publication Data

US 2006/0043901 A1     Mar. 2, 2006

(30) Foreign Application Priority Data

Sep. 2, 2004    (JP) .............................. 2004-255369

(51) Int. Cl.
*B60Q 1/26* (2006.01)

(52) U.S. Cl. .................. 340/469; 250/208.1; 307/10.8; 315/82; 382/104

(58) Field of Classification Search ................ 340/901, 340/425.5, 468, 469; 250/208.1; 362/494, 362/464, 487; 315/82, 77, 291, 80, 194; 320/150; 382/104; 307/10.8; 359/604, 601
See application file for complete search history.

(56) References Cited

U.S. PATENT DOCUMENTS

| | | | | |
|---|---|---|---|---|
| 5,719,486 A | * | 2/1998 | Taniguchi et al. | 322/28 |
| 5,896,010 A | * | 4/1999 | Mikolajczak et al. | 315/77 |
| 5,955,842 A | * | 9/1999 | Dykes | 315/82 |
| 6,734,634 B2 | * | 5/2004 | Kim | 315/82 |
| 7,075,237 B2 | * | 7/2006 | Sato et al. | 315/82 |
| 2002/0093741 A1 | * | 7/2002 | Bechtel et al. | 359/604 |
| 2004/0113494 A1 | * | 6/2004 | Karuppana et al. | 307/10.8 |

FOREIGN PATENT DOCUMENTS

| | | |
|---|---|---|
| DE | 103 46 695 | 5/2004 |
| DE | 10 2004 012 185 | 9/2004 |
| JP | 10-86746 | 4/1998 |
| JP | 2003-317978 | 11/2003 |
| JP | 2004-39288 | 2/2004 |
| JP | 2004-122986 | 4/2004 |
| JP | 2004-134147 | 4/2004 |

OTHER PUBLICATIONS

Patent Abstracts of Japan, Publication No. 10-086746, Publication Date: Apr. 7, 1998, 2 pages.

(Continued)

*Primary Examiner*—Brent Swarthout
(74) *Attorney, Agent, or Firm*—Osha Liang LLP

(57) ABSTRACT

A higher voltage out of a battery voltage applied to an ignition voltage terminal or a control voltage applied to a control voltage terminal is supplied to a switching regulator via a diode. Then, a supply of current to an LED in the switching regulator is controlled in compliance with the control voltage while using an input voltage as energy. When a PWM signal is input into a control voltage terminal as the control voltage, transistors are turned off and on, whereby an instruction to turn on the LED in a dimmed lighting mode is issued to the switching regulator. Then, a current that is smaller than that supplied in a full lighting mode is supplied to the LED.

4 Claims, 4 Drawing Sheets

OTHER PUBLICATIONS

Patent Abstracts of Japan, Publication No. 2004-122986, Publication Date: Apr. 22, 2004, 1 page.

Patent Abstracts of Japan, Publication No. 2004-134147, Publication Date: Apr. 30, 2004, 1 page.

Patent Abstracts of Japan, Publication No. 2003-317978, Publication Date: Nov. 7, 2003, 1 page.

German Office Action for German Patent Application No. 10 2005 041 791.4-31, Dated Oct. 31, 2007, and English translation thereof, 7 pages.

Patent Abstracts of Japan, Publication No. 2004-039288, Publication Date: Feb. 5, 2004, 1 page.

* cited by examiner

LIGHTING CONTROL CIRCUIT FOR VEHICLE LIGHTING EQUIPMENT

BACKGROUND OF THE INVENTION

1. Technical Field

The present invention relates to a lighting control circuit for vehicle lighting equipment and, more particularly, a lighting control circuit for a vehicle lighting equipment constructed to control the lighting of a semiconductor light source that is formed of a semiconductor light emitting device.

2. Related Art

In the prior art, as the vehicle lighting equipment, the equipment using a semiconductor light emitting device such as LED (Light Emitting Diode), or the like as a light source is known. Also, the vehicle lighting equipment of this type is equipped with a lighting control circuit that controls the lighting of the LED.

In northern Europe, North America, and others, particularly in the district where an amount of solar radiation is small even in the daytime of winter, the driver is bound to turn on the headlamp of his or her car in the daytime. Therefore, in the vehicle such as the car, or the like sold in these countries, the configuration for turning on the headlamp as the DRL (Daytime Running Light) is employed, as the lamp control system that is used to turn on the headlamp in a dimmed lighting mode even in the daytime (see JP-A-10-86746 (page 2 to page 5, FIG. 1).

In turning on the headlamp of the vehicle as the DRL, there are two ways, i.e., one is the method of using the dedicated lamp as such headlamp and the other is the method of applying the existing lamp to such headlamp. For example, when the bulb having a filament made of halogen, or the like is used as the dedicated lamp, such bulb can be turned on in a dimmed lighting mode by causing the bulb to emit a light at the designated brightness. While, when the LED is used as the dedicated lamp, such LED can be turned on in a dimmed lighting mode by supplying a predetermined power or current to the LED.

In contrast, when the existing lamp is also applied to such headlamp, e.g., when the low-beam headlamp or the high-beam headlamp is also applied to such headlamp, these lamps can be turned on in a dimmed lighting mode using a PWM (Pulse WidthModulation) signal, for example, from the viewpoint of energy saving a quantity of light is too much if these lamps are turned on in a full lighting mode. The PWM signal is defined as such a signal that has a frequency in a range of several hundreds Hz to several tens kHz, for example, and turns on/off the power (voltage/current) request at a particular duty ratio. When a duty ratio of the PWM signal is set to 50%, half of the power required in the full lighting mode is put into the lamp and thus the brightness emitted from the lamp gives a quantity of light correspondingly. In case the lamp is turned on in a dimmed lighting mode using the PWM signal, either the bulb using the halogen filament or the LED can be employed as the lamp.

SUMMARY OF THE INVENTION

In employing the electric-discharge lamp as the lamp, the switching regulator is used to supply a rated power to the electric-discharge lamp. Also, in employing the LED as the lamp, the switching regulator is used to supply a rated power to the LED. If the switching regulator is used to drive the light source such as the LED, or the like, a specific current can always be supplied to the LED, or the like.

However, if the PWM signal is employed as the signal to turn on the LED, or the like in a dimmed lighting mode and then this PWM signal is simply input into the switching regulator, an input of the switching regulator is varied by the PWM signal. Thus, there is a possibility that a switching operation of the switching regulator may be badly affected. In other words, the switching regulator must repeat the start/stop in a period of the PWM signal, and as a result a severe endurance test is imposed on the switching regulator.

One or more embodiments of the present invention turn on a semiconductor light source in a dimmed lighting mode by supplying a stable voltage when the semiconductor light source is to be turned on a DRL mode.

In one or more embodiments, a lighting control circuit for vehicle lighting equipment comprises selecting means for selecting a higher voltage from a battery voltage of a vehicle or a control voltage used to control a semiconductor light source; controlling means for controlling a supply of current to the semiconductor light source in response to the control voltage, while using the voltage selected by the selecting means as an energy; and deciding means for deciding whether or not the control voltage corresponds to a voltage used to turn on the semiconductor light source in a dimmed lighting mode; wherein the controlling means reduces the supply of current to the semiconductor light source rather than a full lighting mode when an affirmative decision result is output from the deciding means.

(Effect) When it is decided that the control voltage corresponds to the voltage used to turn on the semiconductor light source in a dimmed lighting mode, a supply of current to the semiconductor light source is reduced smaller than that in a full lighting mode and thus the semiconductor light source is turned on in a dimmed lighting mode. When it is not decided that the control voltage corresponds to the voltage used to turn on the semiconductor light source in a dimmed lighting mode, e.g., the control voltage corresponds to the voltage used to turn on the semiconductor light source in a full lighting mode, the current used in a full lighting mode is supplied to the semiconductor light source and thus the semiconductor light source is turned on in a full lighting mode. In case the voltage given by the PWM signal is supplied as the control voltage when it is decided that the control voltage corresponds to the voltage used to turn on the semiconductor light source in a dimmed lighting mode, the battery voltage is selected instead of the control voltage because this voltage is lower than the battery voltage, and then a supply of current to the semiconductor light source is controlled in compliance with the control voltage, while using the battery voltage as energy. In other words, since the battery voltage as the constant voltage is input into the controlling means, the current can be supplied to the semiconductor light source in a stable condition.

In one or more embodiments, in the lighting control circuit for the vehicle lighting equipment, the deciding means includes average voltage generating means for generating an average voltage by smoothing the control voltage, and dimmed lighting instructing means for instructing the controlling means to control the semiconductor light source in a dimmed lighting mode when the average voltage generated by the average voltage generating means is less than a predetermined voltage that is lower than the battery voltage.

(Effect) When the control voltage is smoothed and converted into the average voltage and then this average voltage is below a predetermined voltage that is lower than the battery voltage, the controlling means is instructed to turn on the semiconductor light source in a dimmed lighting mode. Therefore, when the voltage given by the PWM signal is input as the control voltage, the semiconductor light source can be turned on by the PWM signal in a dimmed lighting mode.

In one or more embodiments, in the lighting control circuit for the vehicle lighting equipment, the deciding means includes average voltage generating means for generating an average voltage by smoothing the control voltage, and dimmed lighting instructing means for instructing the controlling means to control the semiconductor light source in a dimmed lighting mode when the average voltage generated by the average voltage generating means is higher than the battery voltage or a predetermined voltage.

(Effect) When the control voltage is smoothed and converted into the average voltage and then this average voltage is higher than the battery voltage or a predetermined voltage, the controlling means is instructed to turn on the semiconductor light source in a dimmed lighting mode. Therefore, in the condition that the binary signal having H/L levels is employed as the control signal, the semiconductor light source can be turned on in a dimmed lighting mode when the control signal is at H (high level).

In one or more embodiments, the lighting control circuit for the vehicle lighting equipment further comprises turning-off instructing means for instructing the controlling means to turn off the semiconductor light source when it is sensed that the control voltage corresponds to a voltage used to turn off the semiconductor light source.

(Effect) When it is sensed that the control voltage corresponds to the voltage used to turn off the semiconductor light source, the controlling means is instructed to turn off the semiconductor light source. Therefore, the semiconductor light source can be turned off forcibly.

As apparent from the above explanation, according to one or more embodiments, this lighting control circuit for the vehicle lighting equipment can supply the current to the semiconductor light source in a stable condition when the semiconductor light source is to be turned on in a dimmed lighting mode.

According to one or more embodiments, the semiconductor light source can be turned on by the PWM signal in a dimmed lighting mode.

According to one or more embodiments, in the condition that the binary signal having H/L levels is employed as the control signal, the semiconductor light source can be turned on in a dimmed lighting mode when the control signal is at H (high level).

According to one or more embodiments, the semiconductor light source can be turned off forcibly.

DETAILED DESCRIPTION OF THE INVENTION

Figure 1:
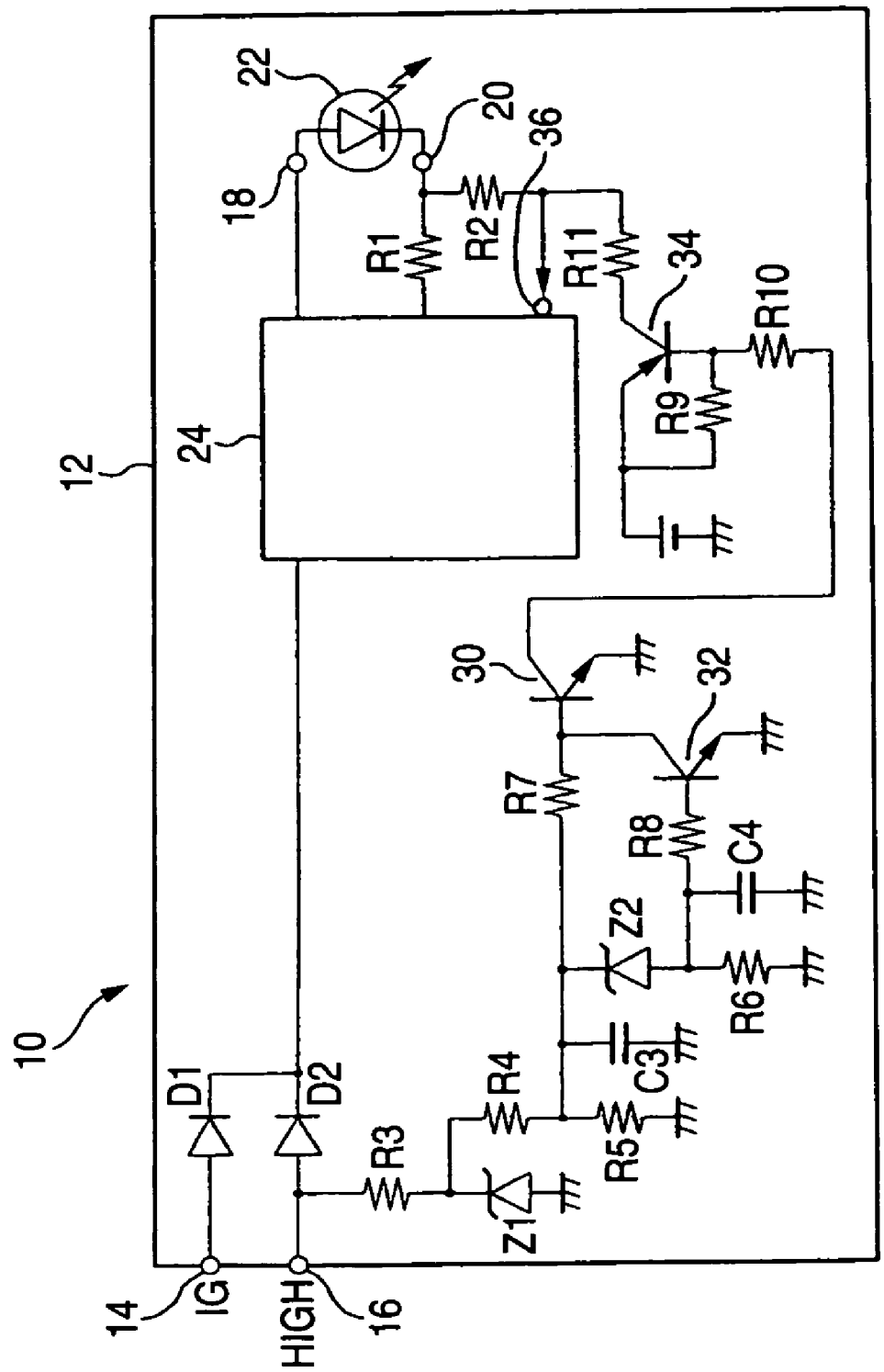
[FIG. 1] A circuit diagram of a lighting control circuit for vehicle lighting equipment showing a first embodiment of the present invention.
Figure 2:
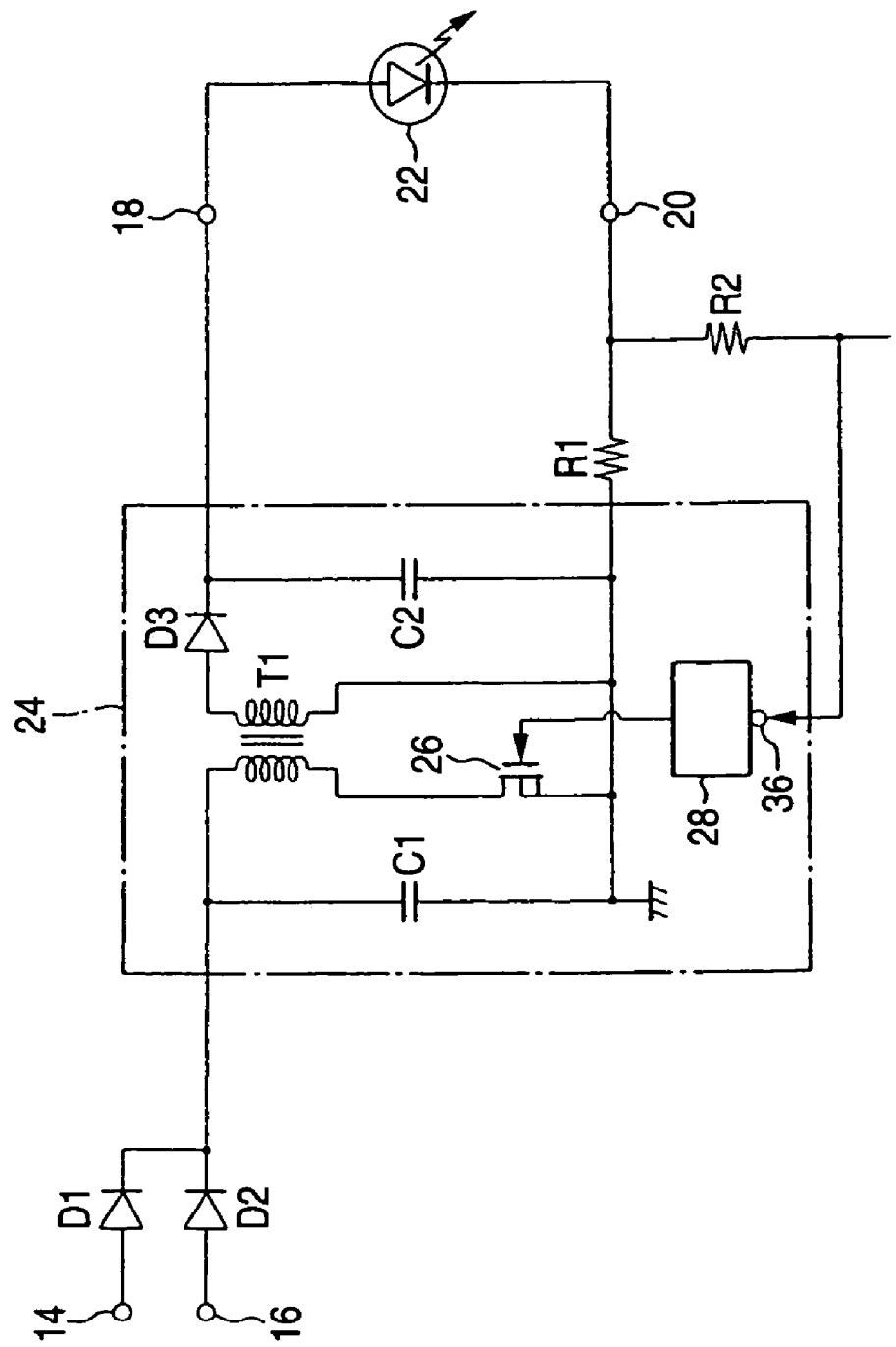
[FIG. 2] A circuit diagram of a switching regulator.
Figure 3:
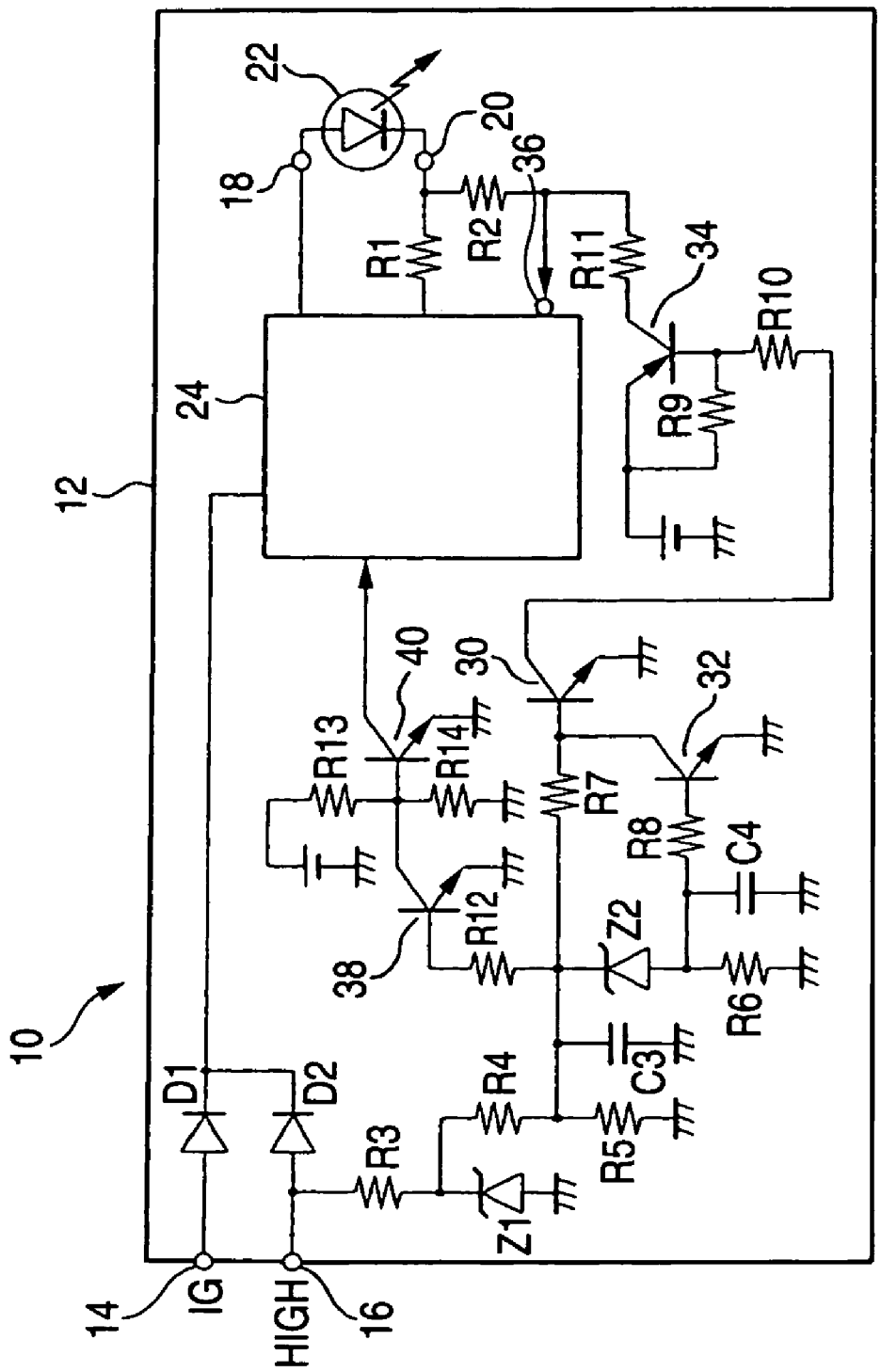
[FIG. 3] A circuit diagram of a lighting control circuit for vehicle lighting equipment showing a second embodiment of the present invention.
Figure 4:
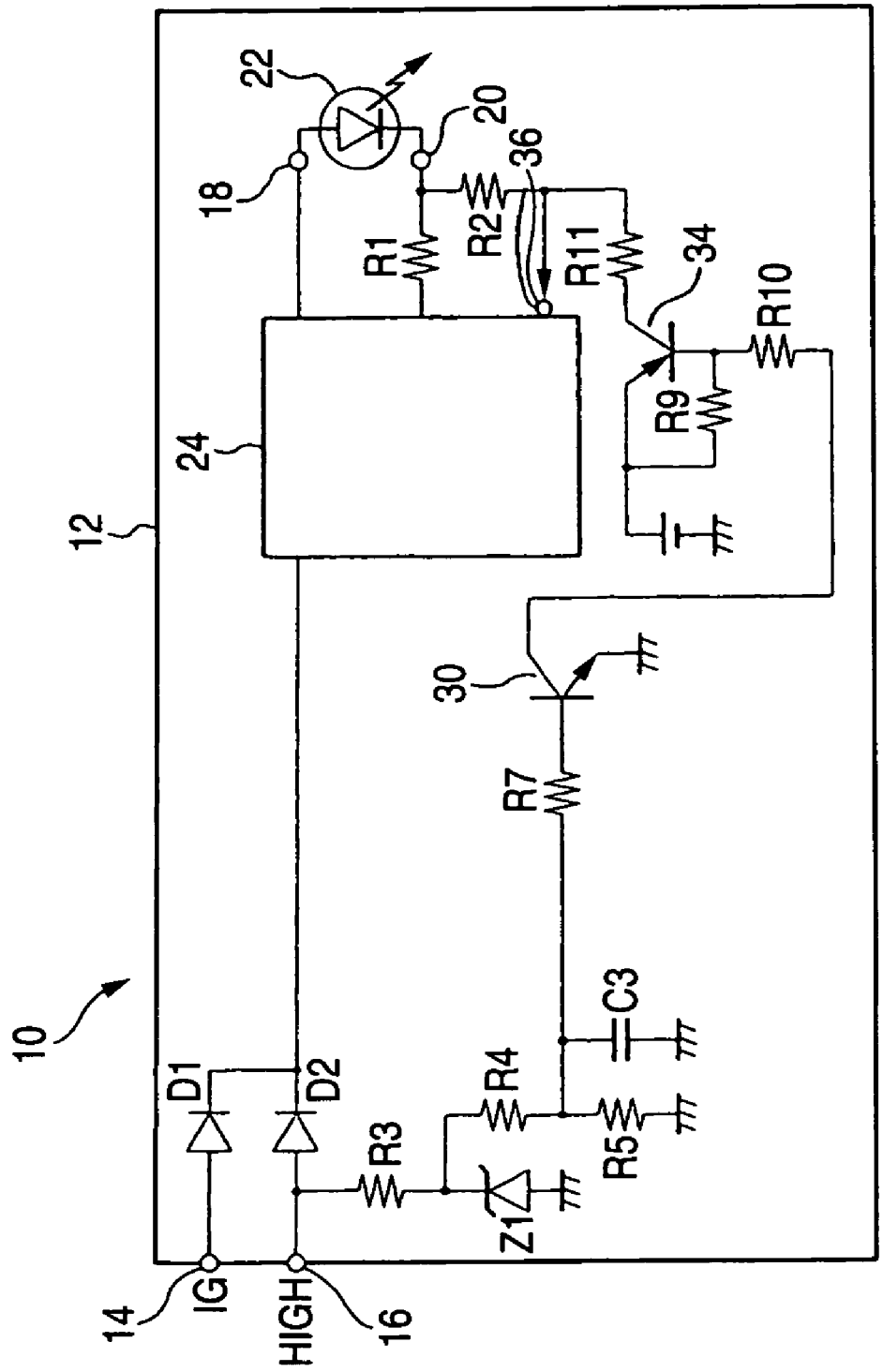
[FIG. 4] A circuit diagram of a lighting control circuit for vehicle lighting equipment showing a third embodiment of the present invention.

Next, embodiments of the present invention will be explained with reference to examples. FIG. 1 is a circuit diagram of a lighting control circuit for vehicle lighting equipment showing a first embodiment of the present invention. FIG. 2 is a circuit diagram of a switching regulator. FIG. 3 is a circuit diagram of a lighting control circuit for vehicle lighting equipment showing a second embodiment of the present invention. FIG. 4 is a circuit diagram of a lighting control circuit for vehicle lighting equipment showing a third embodiment of the present invention.

In these Figures, a lighting control circuit 10 for vehicle lighting equipment has a substrate 12 as one element of the vehicle lighting equipment. An ignition voltage terminal 14, a control voltage terminal 16, and output terminals 18, 20 are provided to the substrate 12. An LED 22 serving as a semiconductor light source composed of a semiconductor light emitting device is connected in series between the output terminal 18 and the output terminal 20. In this case, the LED 22 can be employed in plural, and a plurality of LEDs 22 can be connected in series or in parallel. Also, the LED 22 can be constructed as the light source for various vehicle lighting equipments such as the headlamp, the stop and tail lamp, the fog lamp, the turn-signal lamp, and the like.

A voltage required for ON/OFF operations of an ignition switch of the vehicle is applied to the ignition voltage terminal 14. For example, a voltage of 13 V is applied when the ignition switch is turned on, while a voltage of 0 V is applied when the ignition switch is turned off. Then, the ignition voltage terminal 14 is connected to the anode side of a diode D1, and then the cathode side of the diode D1 is connected to a switching regulator 24.

The control voltage terminal 16 is connected to a control unit that executes controls such as on/off of the lamp. A control voltage of the control signal is applied to the control voltage terminal 16. Then, a resistor R3 as well as the anode side of a diode D2 is connected to the control voltage terminal 16, and the cathode side of the diode D2 is connected to the switching regulator 24. The diodes D1, D2 are constructed as a selecting means that selects a higher voltage when a battery voltage is applied to the ignition voltage terminal 14 and also the control voltage is applied to the control voltage terminal 16, and then outputs the selected voltage to the switching regulator 24. For example, the battery voltage is supplied to the switching regulator 24 when the battery voltage (13 V) is higher than the control voltage (13 V≦0 V) while the ignition switch is turned on, and the control voltage is selected and supplied to the switching regulator 24 when a high level voltage (13 V) is input as the control voltage while the ignition switch is turned off (0 V).

As shown in FIG. 2, the switching regulator 24 includes a transformer T1, capacitors C1, C2, a diode D3, an NMOS transistor 26, and a control circuit 28, as a power supply circuit. The switching regulator 24 as well as resistors R1, R2 constitutes a controlling means. The controlling means is constructed to control a supply of the current to the LED 22 in accordance with the control voltage, while using the voltage selected via the diode D1 or the diode D2 as energy. In this case, the switching regulator 24 converts the current flowing through the LED 22 into the voltage by the shunt resistor R1, and controls a supply of the current to the LED such that a sensed voltage sensed by feeding-back the converted voltage is kept constant. Also, the switching regulator 24 is constructed to execute the control such that a specified current (rated current) is supplied to the LED 22 to keep the brightness of the LED 22 at the specified brightness when the LED 22 is lighted in a full lighting mode by the control voltage whereas the current smaller than that in a full lighting mode is supplied to the LED 22 when the LED 22 is lighted in a dimmed lighting mode.

As circuit elements for instructing the switching regulator 24 to turn on the LED 22 in a full lighting mode or a dimmed lighting mode, resistors R3, R4, R5, R6, R7, R8, R9, R10, R11, Zener diodes Z1, Z2, capacitors C3, C4, NPN transistors 30, 32, and a PNP transistor 34 are provided.

The resistor R3 and the Zener diode Z1 are series-connected mutually and connected to the control voltage terminal 16, and are constructed as a clamping means that removes (clamps) a surge (overvoltage) superposed on the control voltage when the control voltage is applied to the control voltage terminal 16. The voltage clamped by the Zener diode Z1 is supplied to the resistor R5 and the capacitor C3 via the resistor R4. The resistors R4, R5 and the capacitor C3 are constructed as a low-pass filter (average voltage generating means) that generates an average voltage by smoothing the voltage applied to the control voltage terminal 16. This average voltage is applied to the Zener diode Z2 and also applied to a base of the NPN transistor 30 via the resistor R7.

Here, a Zener diode with a Zener voltage of 10 V is used as the Zener diode Z1, and R4=R5 is set. Also, a Zener diode with a Zener voltage of 2.5 V is used as the Zener diode Z2. The control voltage given as the PWM signal is applied to the control voltage terminal 16 as the control voltage. When a signal having an amplitude of 13 V and a duty ratio 50%, for example, is input as the PWM signal, this PWM signal is smoothed to produce the average voltage of 2.5 V. Because this voltage is below the Zener voltage of the Zener diode Z2, the NPN transistor 32 is in its off condition. In contrast, the NPN transistor 30 is turned on because the average voltage (2.5 V) higher than $V_{BE}$ is applied to its base. Then, when the NPN transistor 30 is turned on, the PNP transistor 34 is turned on and then the instruction to turn on the LED 22 in a dimmed lighting mode is input to the control circuit 28 via the resistor R11 and a current sensing terminal 36.

Meanwhile, when a high level voltage, e.g., a 13 V voltage, is applied to the control voltage terminal 16 as the control voltage, this voltage is smoothed by the low-pass filter and the average voltage in excess of 2.5V (5V) is produced. Because this voltage is higher than the Zener voltage (2.5 V) of the Zener diode Z2, the NPN transistor 32 is turned on. Then, when the NPN transistor 32 is turned on, the NPN transistor 30 is turned off and also the NPN transistor 34 is turned off. As a result, the instruction to turn on the LED 22 in a full Lighting mode is input into the control circuit 28.

In other words, the resistor R6, R7, R8, R9, R10, R11, the capacitor C4, the Zener diode Z2, the NPN transistors 30, 32, and the PNP transistor 34 constitute a dimmed lighting instructing means, which gives the instruction to the switching regulator 24 to control the LED 22 in a dimmed lighting mode, when the average voltage is less than a predetermined voltage that is lower than the battery voltage, and constitute a full lighting instructing means, which gives the instruction to the switching regulator 24 to control the LED 22 in a full lighting mode, when the average voltage exceeds the predetermined voltage.

In this manner, in the present embodiment, in the case where the LED 22 is used as the high-beam lamp, as given in Table 1, when the ignition switch is in its on (H) condition, the LED 22 can be turned on in a full lighting mode by applying the high level voltage to the control voltage terminal 16 as the control voltage and also the LED 22 can be turned on in a dimmed lighting mode by applying the control voltage given as the PWM signal to the control voltage terminal 16. Also, when the ignition switch is in its off (L) condition, the LED 22 can be turned on in a full lighting mode by applying the high level voltage, e.g., the 13 V voltage, to the control voltage terminal 16 as the control voltage even though the battery voltage is not applied to the ignition voltage terminal 14.

TABLE 1

|    |   | Control Voltage |                 |
|----|---|-----------------|-----------------|
|    |   | DC = H          | PWM             |
| IG | H | Full lighting   | Dimmed lighting |
|    | L | Full lighting   | —               |

In the present embodiment, since the voltage selected by the diode D1 or the diode D2 is supplied to the switching regulator 24, the LED 22 can always be turned on stably in a dimmed lighting mode when the control voltage given as the PWM signal is applied to the control voltage terminal 16. In this case, since the DRL causes the LED 22 to turn on in a dimmed lighting mode when the ignition switch is turned on, the PWM signal is by no means input into the control voltage terminal 16 when the ignition switch is turned off.

Next, a second embodiment of the present invention will be explained with reference to FIG. 3. In the present embodiment, resistors R12, R13, R14 and NPN transistors 38, 40 are provided as circuit elements constituting turning-off instructing means. This turning-off instructing means gives the instruction to the switching regulator 24 to turn off the LED 22 when it is sensed that the control voltage applied to the control voltage terminal 16 corresponds to the voltage used to turn off the LED 22, e.g., 0 V. Other structures are similar to those in FIG. 1.

One end side of the resistor R12 is connected to the Zener diode Z2, and the other end side thereof is connected to a base of the NPN transistor 38. The NPN transistor 38 is constructed such that, while the PWM signal or the high level voltage is applied to the control voltage terminal 16 as the control voltage, such transistor 38 is in its on state to maintain the NPN transistor 40 in its off state.

In contrast, when the low level voltage, e.g., the 0 V voltage, is applied to the control voltage terminal 16, the NPN transistor 38 is turned off and then the NPN transistor 40 is turned on from its off state. Since a collector of the NPN transistor 40 is connected to the control circuit 28, the instruction to turn off the LED 22 is issued to the control circuit 28 when the NPN transistor 40 is turned on. Accordingly, the switching operation of the switching regulator 24 is stopped, then a supply of the current to the LED 22 is stopped, and then the LED 22 is forcibly turned off.

In the present embodiment, there is no necessity to turn on the LED 22 as the high beam while the LED 22 is used as the high-beam lamp. And, when merely the other lamp, e.g., the low-beam lamp must be turned on, the switching regulator 24 is shut down by applying the low level voltage (0 V) to the control voltage terminal 16, so that the LED 22 can be forcibly turned off.

Namely, in the present embodiment, as given in Table 2, the LED 22 can be turned on or turned off in a full lighting mode, a dimmed lighting mode, and a non-lighting mode in response to the control voltage applied to the control voltage terminal 16.

TABLE 2

|    |   | Control Voltage |                 |              |
|----|---|-----------------|-----------------|--------------|
|    |   | DC = H          | PWM             | DC = L       |
| IG | H | Full lighting   | Dimmed lighting | Non-lighting |
|    | L | Full lighting   | —               | Non-lighting |

Next, a third embodiment of the present invention will be explained with reference to FIG. 4. In the present embodiment, the Zener diode Z2, the resistors R6, R8, the capacitor C4, and the NPN transistor 32 are deleted from the circuit elements shown in FIG. 1. Other structures are similar to those in FIG. 1.

In other words, in the present embodiment, the resistors R7, R9, R10, R11, the NPN transistor 30, and the PNP transistor 34 constitutes a dimmed lighting instructing means, which gives the instruction to the switching regulator 24 to control the LED 22 in a dimmed lighting mode, when the average voltage generated by the low-pass filter is at the battery voltage or is higher than a predetermined voltage, and constitute a full lighting instructing means, which gives the instruction to the switching regulator 24 to control the LED 22 in a full lighting mode, when the average voltage is lower than a predetermined voltage.

More particularly, when a binary signal having H(high level)/L(low level) is input into the control voltage terminal 16 as the control voltage, the NPN transistor 30 is turned on in response to H (high level) of the control voltage and also the PNP transistor 34 is turned on. Thus, the instruction to turn on the LED 22 in a dimmed lighting mode is issued to the control circuit 28. Conversely, when the control voltage is at a L (low level), the NPN transistor 30 is turned off and also the PNP transistor 34 is turned off. Thus, the instruction to turn on the LED 22 in a full lighting mode is issued to the control circuit 28.

In the present embodiment, even though the control voltage is given as the binary signal having H/L, the LED 22 can be turned on in a dimmed lighting mode when the control voltage is at H, and the LED 22 can be turned on in a full lighting mode when the control voltage is at L.

Also, in the present embodiment, the Zener diode Z2, the resistors R6, R8, the capacitor C4, and the NPN transistor 32 are deleted as the circuit elements from the lighting control circuit for the vehicle lighting equipment shown in FIG. 1, and the same elements as those in FIG. 1 are used as other circuit elements. Therefore, the circuit elements can be shared with the lighting control circuit in FIG. 1, and the present embodiment can contribute the standardization of the circuit configurations.

We claim:

1. A lighting control circuit for vehicle lighting equipment comprising:
    selecting means for selecting a higher voltage from a battery voltage of a vehicle or a control voltage used to control a semiconductor light source;
    controlling means for controlling a supply of current to the semiconductor light source in response to the control voltage, while using the voltage selected by the selecting means as an energy; and
    deciding means for deciding whether the control voltage corresponds to a voltage used to turn on the semiconductor light source in a dimmed lighting mode;
    wherein the controlling means reduces the supply of current to the semiconductor light source rather than a full lighting mode when an affirmative decision result is output from the deciding means, and
    wherein the deciding means comprises:
        average voltage generating means for generating an average voltage by smoothing the control voltage, and
        dimmed lighting instructing means for instructing the controlling means to control the semiconductor light source in a dimmed lighting mode when the average voltage generated by the average voltage generating means is less than a predetermined voltage that is lower than the battery voltage.

2. A lighting control circuit for vehicle lighting equipment comprising:
    selecting means for selecting a higher voltage from a battery voltage of a vehicle or a control voltage used to control a semiconductor light source;
    controlling means for controlling a supply of current to the semiconductor light source in response to the control voltage, while using the voltage selected by the selecting means as an energy; and
    deciding means for deciding whether the control voltage corresponds to a voltage used to turn on the semiconductor light source in a dimmed lighting mode;
    wherein the controlling means reduces the supply of current to the semiconductor light source rather than a full lighting mode when an affirmative decision result is output from the deciding means, and
    wherein the deciding means comprises:
        average voltage generating means for generating an average voltage by smoothing the control voltage, and
        dimmed lighting instructing means for instructing the controlling means to control the semiconductor light source in a dimmed lighting mode when the average voltage generated by the average voltage generating means is at a battery voltage or is higher than a predetermined voltage.

3. A lighting control circuit for vehicle lighting equipment, according to claim 1, further comprising:
    a turning-off instructing means for instructing the controlling means to turn off the semiconductor light source when it is sensed that the control voltage corresponds to a voltage used to turn off the semiconductor light source.

4. The lighting control circuit for vehicle lighting equipment according to claim 2, further comprising:
    a turning-off instructing means for instructing the controlling means to turn off the semiconductor light source when it is sensed that the control voltage corresponds to a voltage used to turn off the semiconductor light source.

* * * * *